June 2, 1931. M. BURSTEIN ET AL 1,808,341
TANDEM CHECK FOR GATES
Filed Nov. 19, 1929
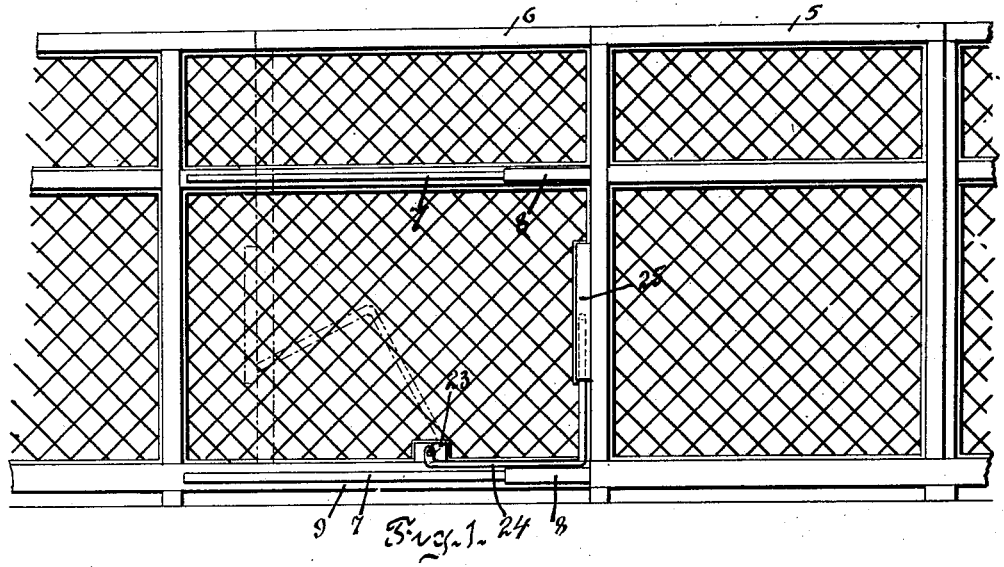
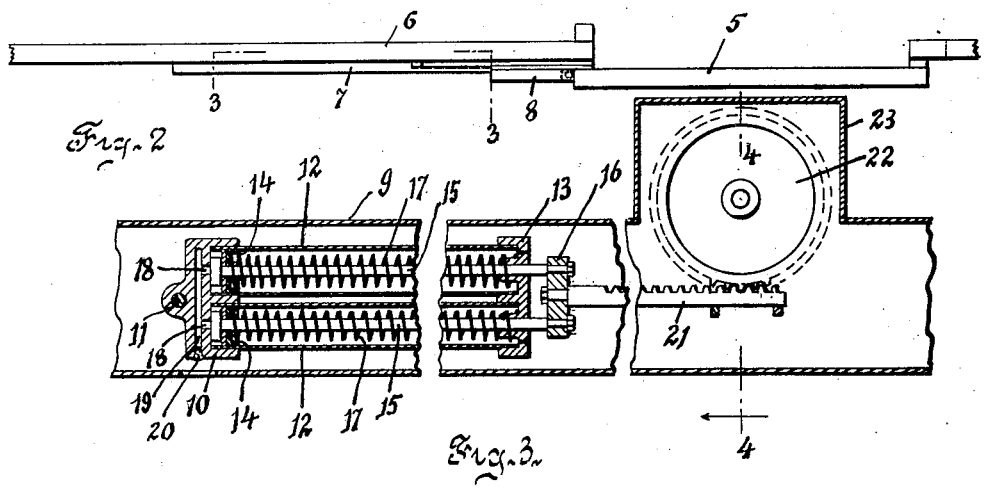
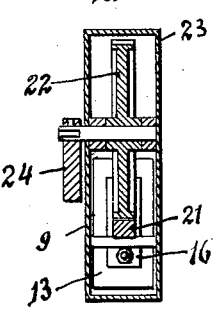
Inventors
M. Burstein &
A. G. Buckenham
By their Attorney
B. Joffe Patented June 2, 1931

1,808,341

UNITED STATES PATENT OFFICE

MAX BURSTEIN AND ARCHIBALD G. BUCKENHAM, OF NEW YORK, N. Y.

TANDEM CHECK FOR GATES

Application filed November 19, 1929. Serial No. 408,192.

Our invention relates to checks for sliding gates and has reference more particularly to sliding gates in low partitions as used in banking houses.

In this type of partition, the overhead check cannot be used. The hollow structural iron members used in such partitions are of definite size and the standard check commonly used is not suitable; first, because it is not permissible to use the check exterior of the structural members; and secondly, because it cannot be fitted within the structural members unless smaller sizes are used, which are not sufficient to operate the gate.

To overcome this objection and to locate the check within the structure, we take two small checks and mount them on parallel axes in special heads, so that they have a common air control and are simultaneously operated.

In the appended drawings forming part of this application, Figure 1 is an elevation of a sliding gate provided with a check embodying our invention.

Figure 2 is a top plan view.

Figure 3 is a vertical section on line 3—3 Figure 2 of the door check and the structural member housing it, and Figure 4 is a vertical section on line 4—4 Figure 3.

Referring to the drawings, the gate 5 is mounted to slide along the adjacent partition wall 6 on tracks 7 for which the gate has runners 8. In the base rail structural member 9 of the partition, a head 10 is anchored pivotally by means of a bolt 11 within the rail 9. The head 10 is recessed to house the ends of two parallelly disposed tubes 12, the other ends of said tubes being housed in another head 13. Each tube forms a cylinder within which a cup piston 14 is mounted, the rod 15 of which projects through the head 13, the projecting ends of the rods 15 being coupled by a member 16. A spring 17 is mounted on each of the rods between the cup piston 14 and the head 13. Each of the cylinders formed by the tubes 12 has an air opening or passage 18, leading into a common passage 19 within the head 10, from which passage the air flow is controlled by a plug 20, accessible from outside of rail 9.

To the member 16, a rack 21 is connected which is in mesh with a gear 22, revolubly mounted in a housing 23, mounted on the rail 9. One end of a right angle lever 24 is connected to the gear 22 to oscillate therewith. The other end of the lever 24 is mounted to slide in the guide 25 secured to the gate 5. The shape of the angular lever renders it unobtrusive in the normal position of the gate.

As the gate is moved from the closed position shown in Figure 1, to the position shown in the dash and dot line in the same figure, the lever 24 is caused to revolve on the axis of the gear 22 and force the gear to revolve therewith; in consequence, drawing the pistons 14 against the resistance of the springs 17, drawing air into the cylinders in back of the pistons, through the passage 19 and openings 18.

The gate is restored to its closed position by the springs 17 which force the pistons with the rods 15 attached thereto, toward the head 10, thereby rotating the gear 22 and therewith the bell crank lever 24, the speed of closing the gate being controlled by the flow of air through the passage 10.

We claim:

In combination with a partition having a hollow base rail, a gate for the partition mounted to slide on said rail, a check for the gate housed in said rail, a rack in the rail movable with the check, a gear in the rail for actuating the rack and a right angle lever having one end thereof keyed to the gear and the other end in slidable engagement with the gate so that one arm of the lever is parallel to the rail in the closed position of the gate.

MAX BURSTEIN.
ARCHIBALD G. BUCKENHAM.